Oct. 23, 1923.
C. E. CARLSON
1,471,882
DEMOUNTABLE BRAKE BAND
Filed June 14, 1922
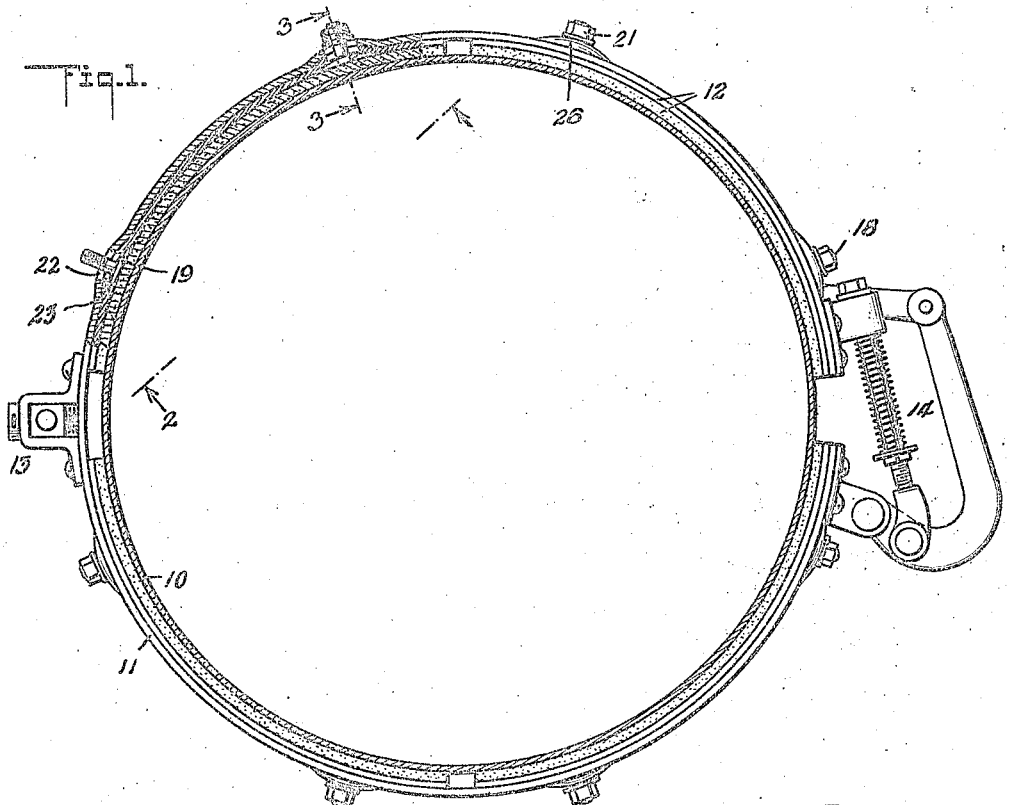
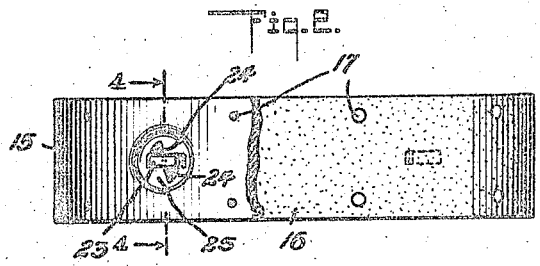
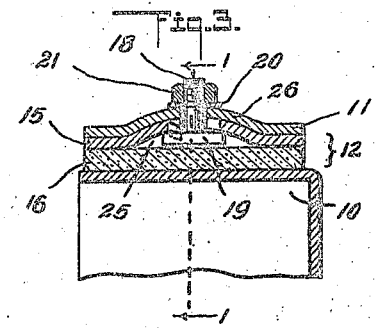
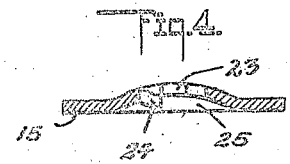
INVENTOR
C. E. Carlson
BY
Geo. L. Beeler
ATTORNEY Patented Oct. 23, 1923.

1,471,882

UNITED STATES PATENT OFFICE.

CARL EDWIN CARLSON, OF BROOKLYN, NEW YORK.

DEMOUNTABLE BRAKE BAND.

Application filed June 14, 1922. Serial No. 568,285.

*To all whom it may concern:*

Be it known that I, CARL EDWIN CARLSON, a citizen of the United States, residing at the city of New York, borough of Brooklyn, in the county of Kings and State of New York, have invented certain new and useful Improvements in Demountable Brake Bands, of which the following is a specification.

This invention relates to mechanical brakes, and has particular reference to brakes of the type commonly applied to automobile running gears but which are obviously applicable to other types of machines in which there is a brake band cooperating with the periphery of a cylindrical or circular brake wheel or drum.

Among the objects of the invention is to provide means whereby a worn or defective brake band may be renewed easily by any person in a few moments of time and at any place and without the necessity for using any unusual or special tools. Under ordinary conditions it frequently occurs that a brake band will fail or show serious defect while a driver is on a tour or trip and when for this reason it is impossible for him to reach with convenience or safety a repair place or garage for the renewal or interchange of the brake band.

Another object of the invention therefore is to provide a brake band of peculiar construction and having associated with it a plurality of interchangeable shoes so constructed as to be easily and quickly interchanged or inserted into place while the brake band proper is practically in normal position around the drum.

Another object of the invention is to provide peculiar fastening devices for connecting the interchangeable or removable brake shoes to the brake band, adapting the shoes for the easy interchange already referred to.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of my improved brake band complete, indicating in place the brake drum, in section, and with parts of my improvement in central section corresponding to the line 1—1 of Fig. 3.

Fig. 2 is an inside face view of one of my improved interchangeable shoes, substantially as would be seen from the line 2—2 of Fig. 1, the brake drum being omitted, and with the friction facing broken away at one end to disclose the interior fastening seat.

Fig. 3 is a vertical transverse section on the line 3—3 of Fig. 1.

Fig. 4 is a vertical tranverse section on the line 4—4 of Fig. 2 showing especially the sectional form of the carrier at the seat.

Referring now more specifically to the drawings, 10 indicates the cylindrical portion of the brake drum which may be of any convenient or conventional construction and surrounding which is my improved brake band comprising two main parts,—a brake strap 11 and a series of shoes 12 detachably and interchangeably connectible to the strap while the strap is maintained in place around the drum. Any suitable means such as indicated at 13 may be employed to anchor the brake band as a whole to the machine and also any suitable controlling means, as 14, may be provided for manipulating the brake band around the drum. As to the drum, anchor means 13, and controlling means 14, I do not wish to be particularly limited since any suitable or conventional devices may be employed.

Whereas in the usual construction the brake band comprises a strap carrying on its inner face friction material in one or two sections, the same being secured to the strap by rivets or the like requiring special facilities for renewal or replacement, in my new construction I make a greater number of interchangeable shoes 12, shown herein as four in number, all of the same length circumferentially, and each but slightly less than a quadrant in length. These shoes, as already stated, are all made exactly alike and so are interchangeable, making it expedient for any desired or necessary number of them to be connected to the brake strap at any time, either all four new ones or any number less than four. Moreover, in view of the tendency sometimes for a brake band to wear at one spot more than other places it is quite expedient with my improvement for the operator to interchange a worn shoe with one not so much worn on the same brake band, so as to correct a defective brake, even without employing new sections or shoes. One of my principal purposes however is to provide these shoes so that one or more of them may be carried as spares in the tool box for emergency use.

As indicated each shoe comprises two main parts,—a carrier 15, made preferably of a good quality of steel or the like, of moderate thickness, and shaped to conform to the inner surface of the strap 11, and a facing member 16 of any suitable gripping material, such as a composite asbestos and metal nature. The carrier and facing members are secured rigidly together as by rivets 17 or the like so that each shoe is treated as a unit and as such is adapted to be inserted into place between the strap 11 and the drum while the strap is in place surrounding the drum, the shoe being easily slipped laterally between the strap and the drum, the strap being sufficiently loose for this purpose.

Separable fastening means of any suitable or convenient nature may be provided for locking the shoes from lateral or circumferential displacement or movement with respect to the strap. For this purpose I provide a series of screws or bolts 18 each having a T-head 19 on its inner end, and a lock washer 20 and nut 21 on its outer end. I indicate preferably the use of two of these bolts for co-operation with each shoe. The strap and carrier are formed with registering slots or holes 22 and 23 respectively through which the head 19 of the bolt may pass radially of the entire construction, and after the bolt is inserted it is given a quarter turn until the head is stopped against one or a pair of lugs 24 struck inward from the side wall portions of the slot 23. The spring washer 20 and nut 21 are then tightened to lock the bolt from reverse movement, and consequently the shoe will be locked to the inner surface of the strap. The operator may easily observe the registration of the two slots 22 and 23 when applying a new shoe, and the bolts are easily slipped into place in the manner indicated while the shoe is in the position of such registry. It will be understood accordingly that the shoe may consequently be easily put in place laterally or by a movement parallel to the axis of the drum and the fastening means put into place from the outside of the strap, without compelling the machine to be taken to a shop or for the disconnection of the strap from the machine.

In order to accommodate the heads 19 of the bolts in connection with the strap and carriers, and without disturbing the outer circular form of the facing members or subjecting the heads of the bolts to wear when the facing members may become worn through, I prefer to form for each bolt a seat on the inner surface of the carrier, the same being in the form of a spherical segment 25. The strap is formed accordingly on its inner surface, in any convenient manner, with a depression, preferably remote from the edges of the strap, and constituting a seat 26 into which the convexed or outer side of the seat 25 is fitted and whereby the registration of the slots 22 and 23 is facilitated. Thus the continuity and strength of the strap are not disturbed or affected, and the exposed edges of the strap and shoes preserve their smooth, neat, and practically conventional appearance. Moreover, by forming the depression or seats remote from the edges of the strap and shoes the projections extending into the same from the shoes serve in a large measure to render the shoes self retained in place, from lateral as well as circumferential displacement.

I claim:

1. In a brake, the combination with a brake strap and a drum surrounded by said strap, of a plurality of shoes insertable laterally between the strap and the drum while the strap is in place therearound, each shoe comprising a facing member of friction material and a carrier to which the facing member is secured and whereby the facing member is held in operative position, and means entirely on the outside of the facing member and passing radially outward through the carrier for securing the shoe in position within the strap.

2. A device as set forth in claim 1 in which the means for fastening the shoes in place is insertable through the strap from the outside thereof.

3. A device as set forth in claim 1 in which the fastening means for the shoes comprises a series of T-headed bolts, the heads being insertable radially of the brake from the outside of the strap.

4. In a brake, the combination of a strap having a plurality of depressions formed on its inner surface remote from its edges and constituting seats, brake shoes having similarly formed projections at their outer surfaces adapted to fit into said seats of the strap, and means to lock the shoes to the strap in connection with said seats.

5. A device as set forth in claim 4 in which the interfitting strap and shoe seats are formed with registering slots and the fastening means includes T-headed bolts the heads of which are adapted to pass through said slots and subsequently turn around their axes for interlocking the heads in place.

6. The herein described interchangeable shoe for vehicle brakes, the same comprising a carrier, a facing member of friction material, means to secure the facing member to the carrier as a commercial unit, and means entirely on the outside of the facing member and passing radially outward through the carrier for securing the shoe in operative position.

In testimony whereof I affix my signature.

CARL EDWIN CARLSON.